United States Patent
Long

(10) Patent No.: US 9,980,468 B2
(45) Date of Patent: May 29, 2018

(54) BIRD FEEDER WITH DISPOSABLE BIRD SEED TRAY

(71) Applicant: Mitchell Marketing Group, Inc., Carmel, IN (US)

(72) Inventor: Jan M. Long, Carmel, IN (US)

(73) Assignee: Mitchell Marketing Group, Inc., Carmel, IN (US)

( * ) Notice: Subject to any disclaimer, the term of this patent is extended or adjusted under 35 U.S.C. 154(b) by 0 days. days.

(21) Appl. No.: 15/604,746

(22) Filed: May 25, 2017

(65) Prior Publication Data

US 2017/0258052 A1    Sep. 14, 2017

Related U.S. Application Data

(62) Division of application No. 14/571,713, filed on Dec. 16, 2014, now Pat. No. 9,686,968.

(51) Int. Cl.
*A01K 39/00* (2006.01)
*A01K 39/014* (2006.01)

(52) U.S. Cl.
CPC .................. *A01K 39/014* (2013.01)

(58) Field of Classification Search
CPC .. A01K 39/012; A01K 39/014; A01K 5/0114; A01K 39/0113; A01K 5/0121; A01K 31/12
USPC .......... 119/57.8, 52.2, 51.01, 57.9, 429, 432, 119/462
See application file for complete search history.

(56) References Cited

U.S. PATENT DOCUMENTS

| | | | | |
|---|---|---|---|---|
| 3,354,868 A | * | 11/1967 | Woodling | A01K 39/012 119/52.2 |
| 3,391,847 A | * | 7/1968 | Christine | B65D 51/185 220/257.2 |
| 3,654,904 A | | 4/1972 | Krueger | |
| 4,408,565 A | | 10/1983 | Kerbs et al. | |
| 4,606,298 A | | 8/1986 | Bridge | |
| 4,656,068 A | * | 4/1987 | Raines | B32B 27/08 229/123.1 |
| 4,747,370 A | * | 5/1988 | Olson | A01K 39/012 119/52.2 |
| 4,880,112 A | * | 11/1989 | Conrad | B65D 77/20 119/61.54 |
| 4,947,797 A | * | 8/1990 | Lawrence, Jr. | A01K 39/00 119/52.2 |
| 4,958,595 A | * | 9/1990 | Richman | A01K 39/012 119/52.2 |
| 5,234,159 A | * | 8/1993 | Lorence | B65D 1/36 206/557 |
| 5,346,710 A | * | 9/1994 | Geitner | A01K 5/0121 119/51.5 |

(Continued)

FOREIGN PATENT DOCUMENTS

CA    2101221    1/1995

*Primary Examiner* — Yvonne R Abbott-Lewis
(74) *Attorney, Agent, or Firm* — Woodard, Emhardt, Moriarty, McNett & Henry LLP

(57) ABSTRACT

A bird feeder system includes a tray, a packaging system, and a housing. The tray defines a receptacle configured to hold a consumable, such as bird seed. The packaging system is configured to retain the consumable in the receptacle of the tray. At least part of the packaging system is configured to open to allow access to the consumable in the receptacle. The housing has a tray engagement structure configured to secure the tray to the housing.

26 Claims, 6 Drawing Sheets

(56) References Cited

U.S. PATENT DOCUMENTS

| | | | | |
|---|---|---|---|---|
| 5,479,881 A * | 1/1996 | Lush | A01K 39/012 | 119/57.8 |
| 5,495,825 A * | 3/1996 | Eckelman | A01K 39/014 | 119/57.8 |
| 5,740,758 A * | 4/1998 | Damm | A01K 39/0106 | 119/57.8 |
| 5,839,574 A * | 11/1998 | Lorence | B65D 77/0433 | 206/216 |
| 5,894,813 A * | 4/1999 | George | A01K 39/0113 | 119/57.9 |
| 5,957,087 A * | 9/1999 | Bonder | A01K 39/014 | 119/429 |
| 6,354,244 B1 | 3/2002 | Green | | |
| 6,581,540 B1 * | 6/2003 | LaVanish | A01K 39/012 | 119/51.01 |
| 6,672,248 B2 * | 1/2004 | Bourigault | A01K 5/0114 | 119/51.01 |
| 7,565,881 B2 * | 7/2009 | Smothers | A01K 39/012 | 119/72 |
| 7,930,995 B2 * | 4/2011 | Vosbikian | A01K 39/014 | 119/57.8 |
| 8,109,235 B2 * | 2/2012 | Lipscomb | A01G 9/02 | 119/61.57 |
| 8,347,817 B1 * | 1/2013 | Miller | A01K 5/0291 | 119/54 |
| 8,544,412 B1 * | 10/2013 | Haverstock | A01K 5/0135 | 119/61.5 |
| 8,622,022 B2 | 1/2014 | Hepp et al. | | |
| 2005/0045110 A1 * | 3/2005 | Franck, Jr. | A01K 5/0114 | 119/57.8 |
| 2006/0037544 A1 * | 2/2006 | Hunter | A01K 31/12 | 119/65 |
| 2008/0017655 A1 * | 1/2008 | Martel | A01K 5/0114 | 220/574.3 |
| 2008/0314327 A1 * | 12/2008 | Hepp | A01K 39/0113 | 119/75 |
| 2009/0071408 A1 * | 3/2009 | Wechsler | A01K 39/012 | 119/51.01 |
| 2012/0266824 A1 | 10/2012 | Trauttmansdorf et al. | | |

* cited by examiner

BIRD FEEDER WITH DISPOSABLE BIRD SEED TRAY

CROSS-REFERENCE TO RELATED APPLICATION

This application is a divisional of U.S. application Ser. No. 14/571,713 filed Dec. 16, 2014, which is hereby incorporated by reference.

BACKGROUND

In the bird feeding industry, technological developments have generally focused on the care and well-being of birds at the exclusion of others. For example, bird feeding systems have been developed to prevent squirrels and other animals from stealing bird seed. However, these developments failed to consider the real consumer of bird seed, that is, the actual human purchaser of the bird seed. Typically, bird seed is sold in bulk such as in large boxes and bags. These bulk packages can be quite heavy and can make the process of loading bird seed into a bird feeder quite difficult. During loading, the bird seed can spill on the ground which in turn can attract unwanted animals, such as rodents. When buying in bulk, spoilage of the bird seed is also a concern. Thus, there is a need for improvement in this field.

SUMMARY

A bird feeder system has been developed to address the above-mentioned issues as well as other issues by making it more convenient for consumers to purchase and load bird seed into a bird feeder. Generally speaking, the bird feeder includes a replaceable/disposable container or tray containing bird seed. In one example, the tray comes in the form of a one-use container of loose bird seed that is inserted into a permanent body that together with the container forms the bird feeder. The permanent body includes an eyelet, hook, or other mechanisms for hanging so that the combined feeder can be suspended in any number of manners, such as from a tree or a hanger. The permanent body also includes a roof or other type of overhead protection structure for protecting the container of bird seed from the elements. The permanent body also includes a coupling mechanism configured to secure the tray to the permanent body. In one example, the coupling mechanism includes a groove into which the tray is slid, but the coupling mechanism can be configured differently in other examples. The disposable tray expedites cleaning of the bird feeder and replenishment of bird seed.

More specifically, the container or tray is designed for single use. Therefore, the container can be disposed of after the food contained within has been consumed or a new container is otherwise desired. The container can be purchased separately from the bird feeder housing and is pre-packed with bird seed or other consumables. The container is also sealed to prevent spoilage or contamination of the contained food during storage or transportation. The sealing can be accomplished through various methods.

The container can be surrounded by a plastic bag that is removed and disposed of prior to use. The container can alternatively include a removable top of plastic, paper, and/or metal and can optionally be removed with an integrated ring or tab similar to canned goods or the like. The top of the container can be perforated or scored to define a removable section of the top. If the container is a tray, the lip of the tray can be used as a perch for birds feeding from the tray. The tray can also be mounted at an angle within the bird feeder to encourage replenishment of accessible bird seed via gravitational effects on the bird seed.

Further forms, objects, features, aspects, benefits, advantages, and examples of the present invention will become apparent from a detailed description and drawings provided herewith.

DETAILED DESCRIPTION

Figure 1:
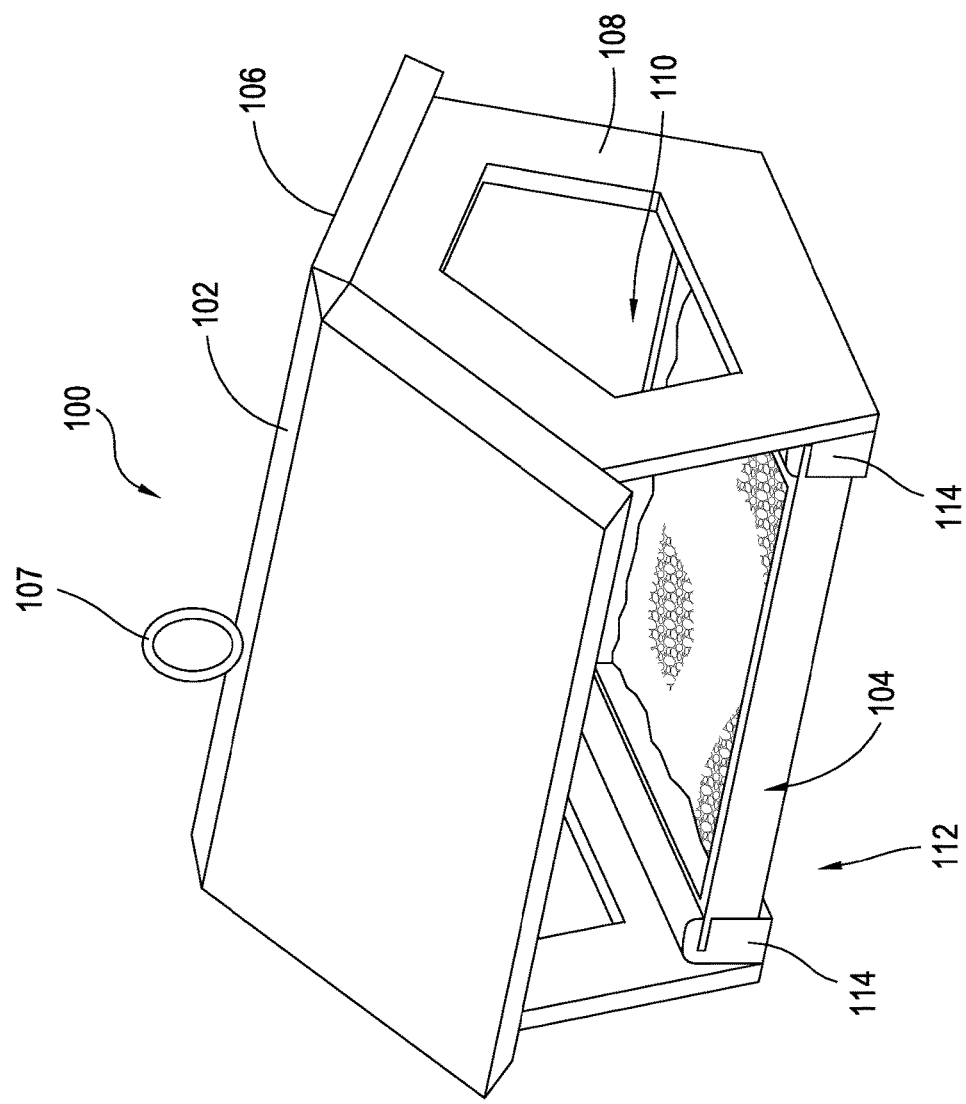
FIG. 1 shows a perspective view of a bird feeder.

For the purpose of promoting an understanding of the principles of the invention, reference will now be made to the examples illustrated in the drawings and specific language will be used to describe the same. It will nevertheless be understood that no limitation of the scope of the invention is thereby intended. Any alterations and further modifications in the described examples, and any further applications of the principles of the invention as described herein are contemplated as would normally occur to one skilled in the art to which the invention relates. One example of the invention is shown in great detail, although it will be apparent to those skilled in the relevant art that some features that are not relevant to the present invention may not be shown for the sake of clarity.

FIG. 1 shows a perspective view of a bird feeder system 100. The bird feeder system 100 includes a housing 102 and a tray or container 104 that is designed to be detachably secured to the housing 102. The tray 104 is designed to be readily removed from the housing 102. By being readily removable and replaceable, the tray 104 provides a convenient way for individuals to replenish bird seed 204 in the bird feeder 100. Typically, a bird feeder is refilled with bird seed by either lugging the bag of bird seed out to location where the bird feeder is hung or otherwise located, or by removing the bird feeder from the tree and taking it to the garage or shed where the bird seed is stored. Both of these ways of replenishing bird seed can be hazardous as well as inconvenient. For example, removal of the birdhouse or pouring bird seed into the birdhouse may require a ladder or stepstool which can be quite hazardous for those with balance or motor skill issues, such as the elderly. Bird seed bags can be quite heavy which in turn can make it difficult for elderly individuals to lift and replenish bird seed. While eating the bird seed, birds tend to leave droppings which can create sanitation and health issues. To address these as well as other issues, the tray 104 in one example is sold prefilled or prepackaged with bird seed for one-time use. After some, most, or all of the bird seed is used, the tray 104 is then discarded, if so desired. The tray 104 can be made so as to be readily replaceable. For example, the tray 104 in one example is designed to be inexpensive such that the tray 104 can be discarded in the garbage, recycled, or even composted after use. By being recyclable or compostable, the tray 104 of the bird feeder 100 is not only environmentally friendly but also convenient because an individual does not have to experience the unpleasant task of cleaning a bird feeder or even a tray contaminated with bird droppings.

The housing 102 can be made from a variety of materials including, but not limited to, wood, plastics, and/or metal, to name just a few examples. The housing 102 includes a canopy or roof 106 that protects the bird seed within the tray 104 from precipitation, such as rain or snow, debris, and exposure to the sun. In other examples, the housing 102 may not have the canopy 106 such that the bird seed is exposed so that birds can readily access the bird seed. A securing structure 107 is secured to the canopy 106 so that the bird feeder 100 can be secured to and/or hung from an object, such as a tree, porch, post, and/or hanger, to name just a few examples. In the illustrated example, the securing structure 107 is in the form of an eyelet, but it should be recognized that the securing structure 107 can be configured differently in other examples. For instance, the securing structure 107 can be in the form of an arm that is used to secure the housing 102 to a post or a tree. With the securing structure 107, the housing 102 remains attached to the tree or other structure, while the tray 104 can be readily removed and replaced or replenished with bird seed on an as-needed basis. The housing 102 further includes one or more sidewalls 108 that are secured to the canopy 106. In the illustrated example, the sidewalls 108 are arranged in an opposing fashion and each include a window cut out or access opening 110 that provides ventilation as well as access to the bird seed on the tray 104 by birds. The access opening 110 can be sized to allow certain sizes of birds within the bird feeder 100 to access the bird seed. The access opening 110 can also be sized to prevent undesirable animals, such as raccoons or squirrels, from accessing the bird seed. In the illustrated example, the access opening 110 has a pentagonal shape, but it is envisioned that in other examples, the access opening 110 can be shaped differently or not be present at all. The housing 102 further includes a tray engagement structure 112 that is configured to detachably secure the tray 104 to the housing 102. In the illustrated example, the tray engagement structure 112 includes one or more tray engagement rails 114 that are disposed in the interior of the housing 102 and secured to the interior sides of the sidewalls 108.

Figure 2:
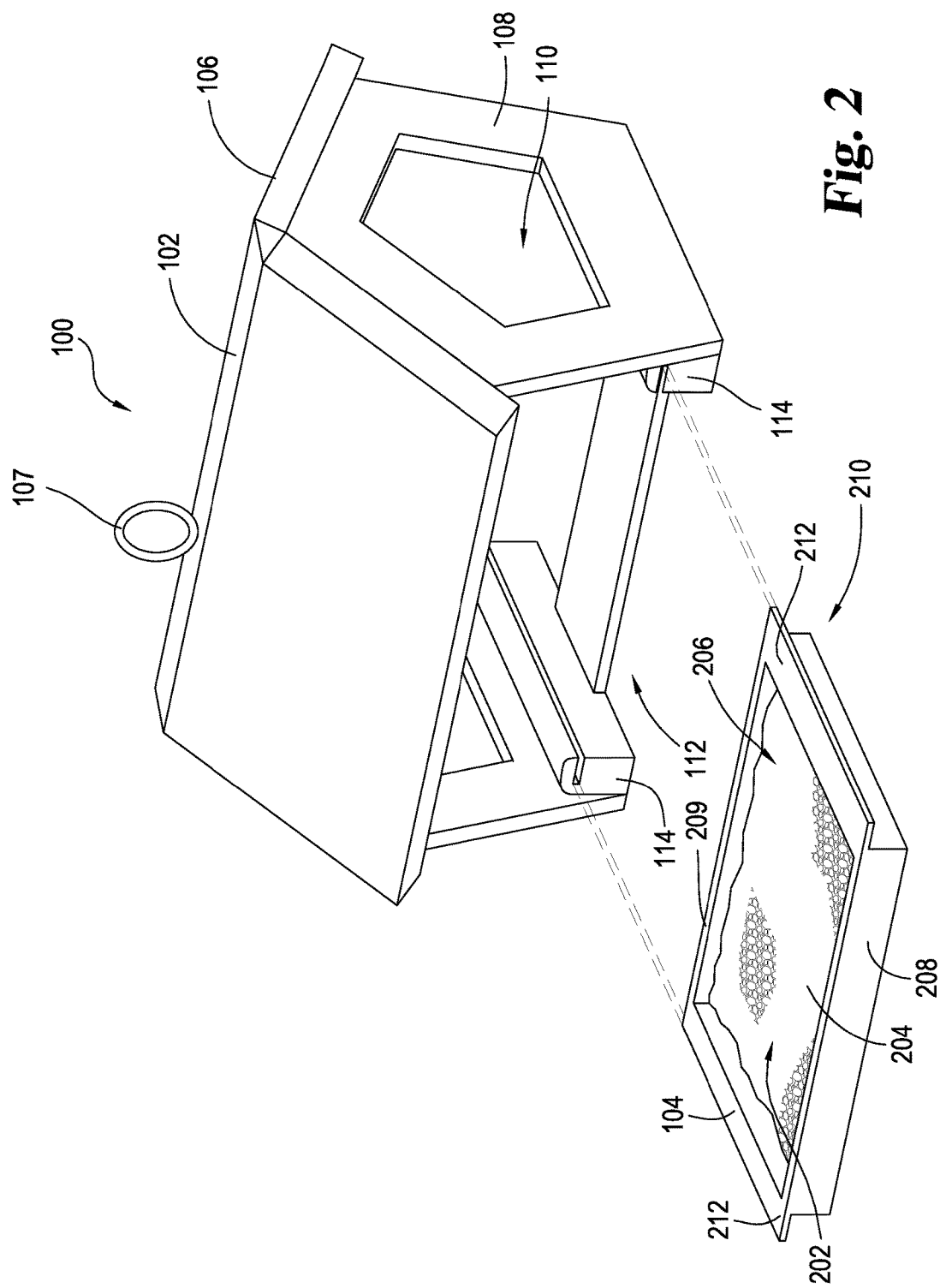
FIG. 2 shows an exploded view of the FIG. 1 bird feeder.

Turning to FIG. 2, which shows an exploded view of the bird feeder 100, the tray 104 includes a receptacle 202 configured to hold bird seed or other consumable foods 204. The tray 104 in one example is made from durable material such as wood and/or heavy plastics such that the tray 104 can be cleaned and readily reused by being refilled with bird seed 204. In another example, the tray 104 is made from inexpensive materials such that the tray 104 can be discarded in the garbage after use so as to eliminate the need of cleaning the tray 104 of bird droppings. The tray 104 in still yet another example is made from environmentally friendly materials so as to be either recycle or composted. For instance, the tray 104 can be made from recyclable plastic, aluminum, and/or paper so that the tray 104 can be recycled after use if so desired, thereby reducing or eliminating the need of cleaning the tray 104. The tray 104 in other forms can be made from compostable material like the paper and/or cardboard used typically in egg cartons as well as rice paper. Various colors and textures can be integrated into the housing 102 and/or tray 104 depending on consumer preference. For example, the bird feeder system 100 can be colored to blend into natural wooded scenery with preferences towards greens and browns or with various colors to match residential homes. The tray 104 can alternatively or additionally be color coded to correspond to the type of consumable housed within.

To promote stacking of trays 104 when full of bird seed 204 and/or nesting of trays 104 when empty, which can be helpful when storing the trays 104 on store shelves, during manufacturing, during shipping, and at an individual's residence, the trays 104 in the illustrated examples have a generally rectangular box shape. This generally rectangular box shape also is especially convenient for mail order delivery. Homebound individuals, such as the elderly, may not always be able to travel to a store to pick up bird seed. With the design of the tray 104, an individual can order a prepackaged tray 104 filled with bird seed 204 to be shipped to their residence on an as-needed basis or through a subscription service. The trays 104 in other examples can of course be shaped differently. The tray 104 defines a receptacle opening 206 so as to allow birds access to the bird seed 204 in the receptacle 202. Receptacle walls 208 of the tray 104 define the sides and bottom of the receptacle 202. In the illustrated example, the receptacle opening 206 is formed at the top of the tray 104 so that birds can readily access the bird seed 204 as well as to prevent spillage of the bird seed 204, but it is envisioned that the receptacle opening 206 can be formed elsewhere, and the tray 104 can include more than one receptacle opening 206. For instance, multiple receptacle openings 206 can be formed in the receptacle walls 208 along the sides of the tray 104. One or more of the receptacle walls 208 can be eliminated or removed from the tray 104 in other examples so as to further facilitate access to the bird seed 204. The receptacle walls 208 of the tray 104 have a rim 209 that surrounds the receptacle opening 206. The rim 209 can optionally be configured to enable birds to perch upon the rim 209 to consume the bird seed. Furthermore, the housing 102 can be designed such that when the tray 104 is mounted to the housing 102, the bird can access and perch upon the rim 209.

Figure 3:
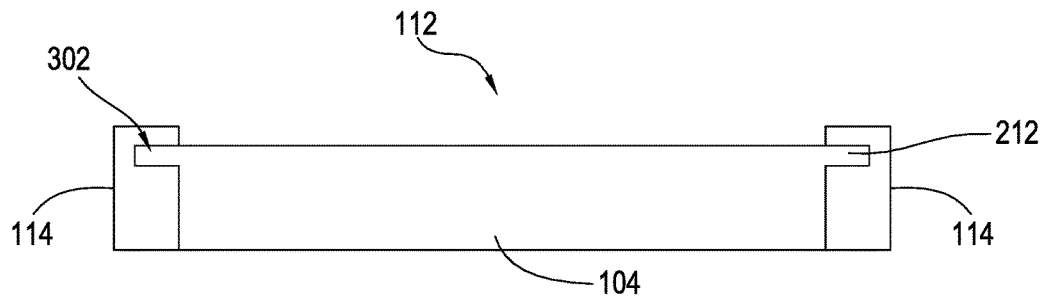
FIG. 3 shows a partial cross-sectional view of a tray inserted into connection rails of the FIG. 1 bird feeder.

As shown in FIGS. 2 and 3, the tray 104 includes a housing engagement structure 210 that is configured to detachably secure the tray 104 to the tray engagement structure 112 of the housing 102. The tray 104 is secured to the housing 102 in a detachable manner, so that the tray 104 can be conveniently installed and removed without the need for extra tools and without damaging the bird feeder 100. The tray 104 is detachably secured to the housing 102 in such a manner that the tray 104 is not readily dislodged from the housing 102 during high winds or other adverse weather conditions. In the illustrated example, the housing engagement structure 210 includes one or more flanges 212. The flanges 212 in the depicted example are located in an opposing manner at opposite ends of the tray 104 so as to provide added stability. The flanges 212 in the illustrated example extend in a rigid manner from the tray 104, but in other examples, the flanges 212 are able to fold so as to make the tray 104 more compact for distribution and/or storage. In one particular example, the flanges 212 form flaps that all or in part form the packaging that encloses the receptacle opening 206. Looking at FIG. 3, which shows an enlarged cross-sectional view of the tray 104 engaged with the tray engagement structure 112 of the housing 102, the flanges 212 of the tray 104 are slidably received into respective grooves 302 defined in each of the tray engagement rails 114 of the housing 102. It should be recognized that the tray 104 can be detachably secured to the housing 102 in other manners. For example, the tray 104 can include grooves and the housing 102 can include flanges that are received in the grooves of the tray 104. In another example, one or more hook and loop fasteners, commonly referred by the brand name Velcro®, are used to secure the tray 104 to the housing 102. In another example, a snap type connection that can be readily released by hand is used to secure the tray 104 to the housing 102. Alternatively or additionally, a locking mechanism can be used to hold the tray 104 in position, such as a clasp or a rotating knob.

As mentioned before, the bird seed 204 can be prepackaged with in the tray 104 when sold to the consumer. This not only provides convenience for the consumer but also ensures that the bird seed 204 remains fresh and not spoiled before use. Typically, when bird seed, especially in bulk, is not properly stored the bird seed can easily spoil so as to be unusable. By prepackaging the bird seed 204 in the individual trays 104, the bird seed 204 can be protected from detrimental environmental conditions so as to reduce the risk of spoilage and ensure freshness. Moreover, the prepackaging of the bird seed 204 in the trays 104 reduces the risk of an individual spilling bird seed when replenishing the bird feeder 100. This prepackaging also allows the bird seed 204 and tray 104 to be shipped using a mail order program in which an individual can order the bird seed on an as-needed basis or using a subscription model in which the tray 104 prepackaged with the bird seed 204 is shipped according to a routine schedule (e.g., once a week or month). Moreover, because the bird seed 204 is packaged in individual trays 104 and not in bulk or large amounts, individuals can be a little bit more adventuresome in the bird seed they purchase and experiment to see which bird seed attracts the birds they desire. In other words, this prepackaging of the bird seed 204 makes replenishing bird seed very convenient for an individual.

Figure 4:
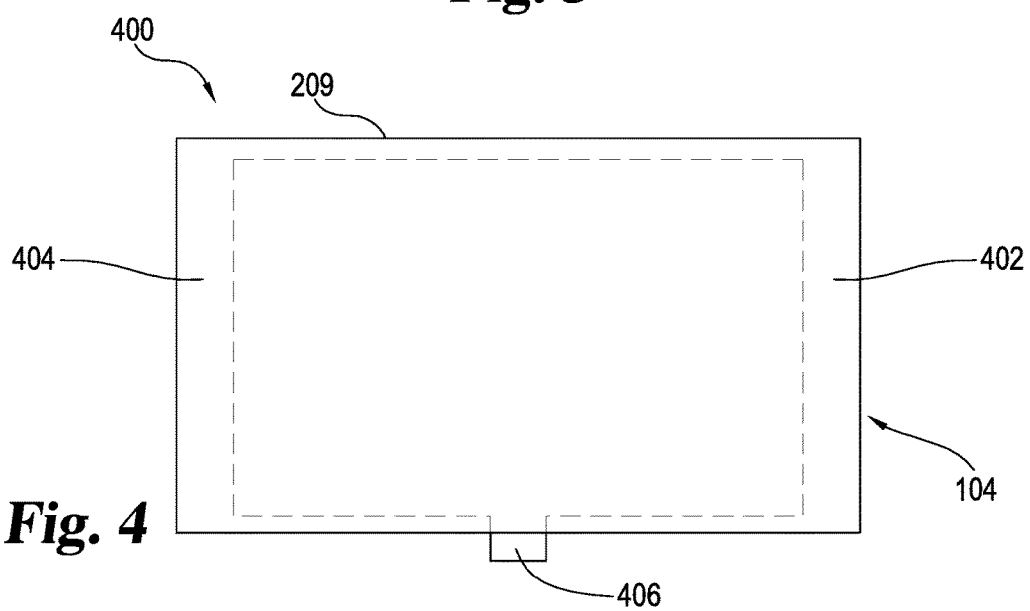
FIG. 4 shows a top view of a tray for the FIG. 1 bird feeder that includes a perforated cover.
Figure 5:
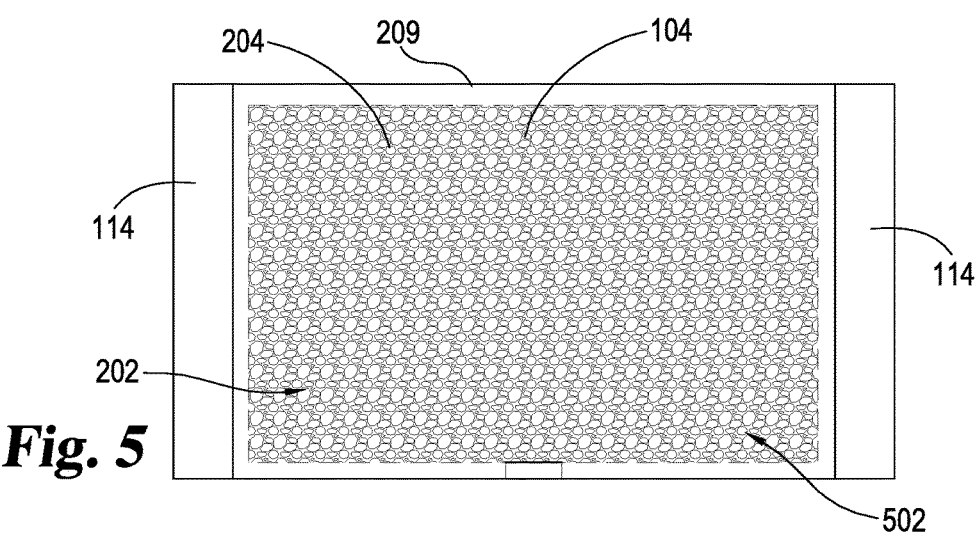
FIG. 5 shows a top view of the FIG. 4 tray with the perforated cover removed.

FIGS. 4 and 5 show one example of a packaging system 400 for prepackaging and retaining the bird seed 204 in the tray 104. As shown in FIG. 4, the packaging system 400 includes a cover 402 in the form of a foil, plastic sheet, and/or recyclable paper that is sealed to the rim 209 of the receptacle walls 208 (FIG. 2) around the periphery of the receptacle 202. The cover 402 is sealed to the tray in an air-tight fashion, such as through adhesives, heat sealing and/or ultrasonic welding. The cover 402 includes a series of perforations 404 around the periphery of the receptacle 202 to facilitate access to the bird seed 204 inside the tray 104. The cover 402 further includes a pull tab 406 that extends from the cover 402 to facilitate tearing open of the cover 402 by hand along the perforations 404. The perforations 404 on the cover 402 are designed to form a cover opening 502 upon removal of a portion of the cover 402 before, during, or after the tray 104 is loaded into the housing 102. As can be seen in FIG. 5, which shows the tray 104 loaded in the housing 102 with the cover 402 removed, the lateral perforations 404 in the cover 402 are located inside of the tray engagement rails 114 of the housing 102 so that an individual can remove the cover 402 after the tray 104 is loaded in the housing. Removing the cover 402 during or after the tray 104 is loaded into the housing 102 reduces the risk of spilling the bird seed 204.

Figure 6:
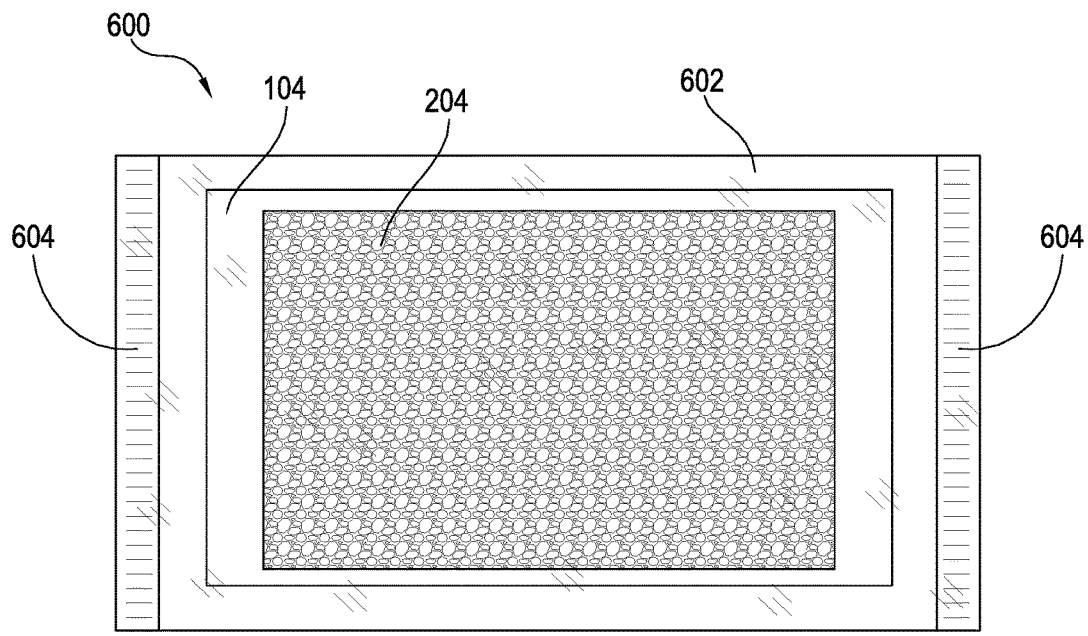
FIG. 6 shows a top view of a tray for the FIG. 1 bird feeder packaged inside a bag.

FIG. 6 shows another example of a packaging system 600 for prepackaging and retaining bird seed 204 inside the tray 104. In this example, the packaging system 600 includes a package or bag 602. As shown, the tray 104 with the bird seed 204 is sealed inside the bag 602 in an air tight manner. In the illustrated example, the bag 602 is made of clear plastic, but the bag 602 in other examples can be opaque and/or made from other materials, such as paper and aluminum foil. To enclose in an airtight manner, the bag 602 has one or more sealed flaps 604. In the depicted example, the sealed flaps 604 are located at opposing ends of the bag 602, but the bag 602 can be sealed in other manners. The sealed flaps 604 can be sealed through heat sealing, adhesives, and crimping, to name just a few examples.

Figure 7:
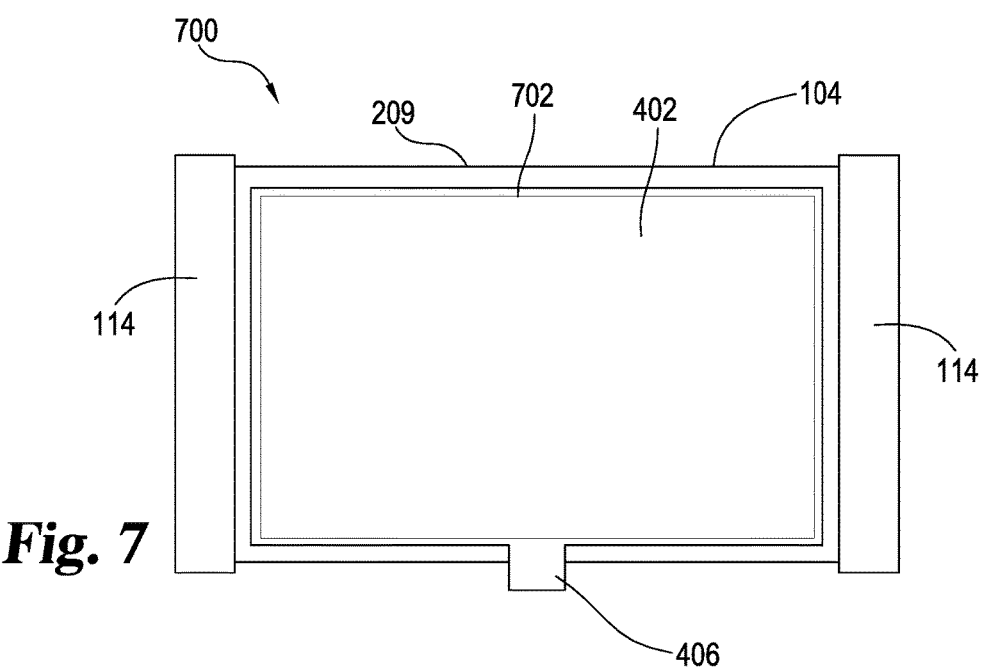
FIG. 7 shows a top view of a tray for the FIG. 1 bird feeder that includes a releasable pull cover.

FIG. 7 shows another example of a packaging system 700 that includes the cover 402 sealing the tray 104. Like before, the cover 402 includes the pull tab 406. In this example, however, the cover 402 is sealed with the tray 104 through a releasable seal 702 that is sealed to the rim 209 of the tray 104. The releasable seal 702 is designed to allow the cover 402 to be removed in its entirety by pulling the cover 402 off the tray 104 via the pull tab 406. In one form, the releasable seal 702 includes a low tack adhesive that can release when pulled. In another form, the releasable seal 702 is in the form of a weakened weld. As shown, the cover 402 is sized in this example so as to fit inside the tray engagement rails 114 so that the cover 402 can be removed before, during, or after the tray 104 is loaded into the housing 102.

Figure 8:
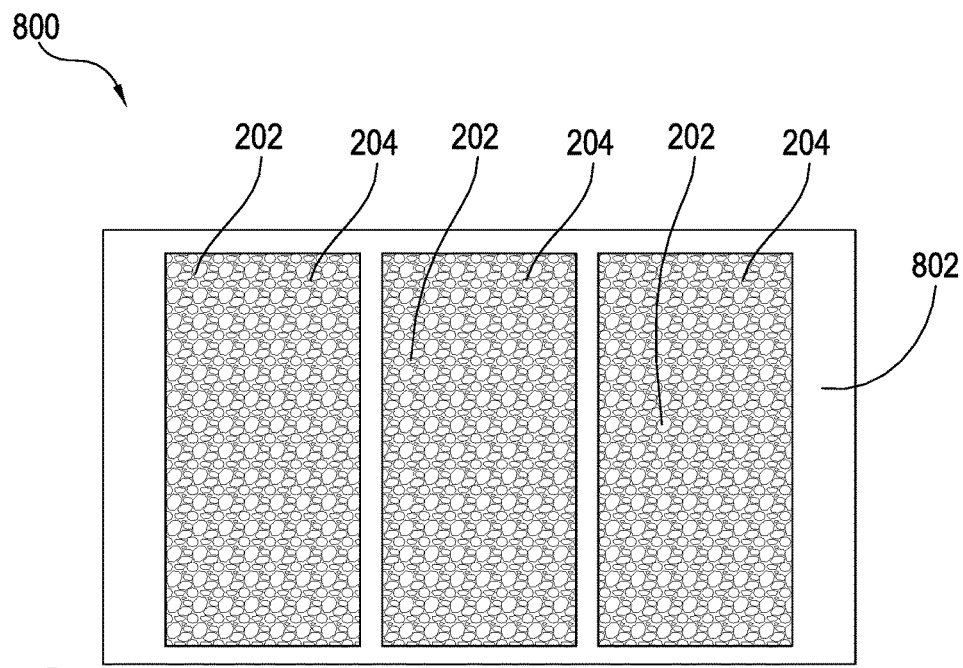
FIG. 8 shows a top view of a tray for the FIG. 1 bird feeder that includes multiple bird seed receptacles.
Figure 9:
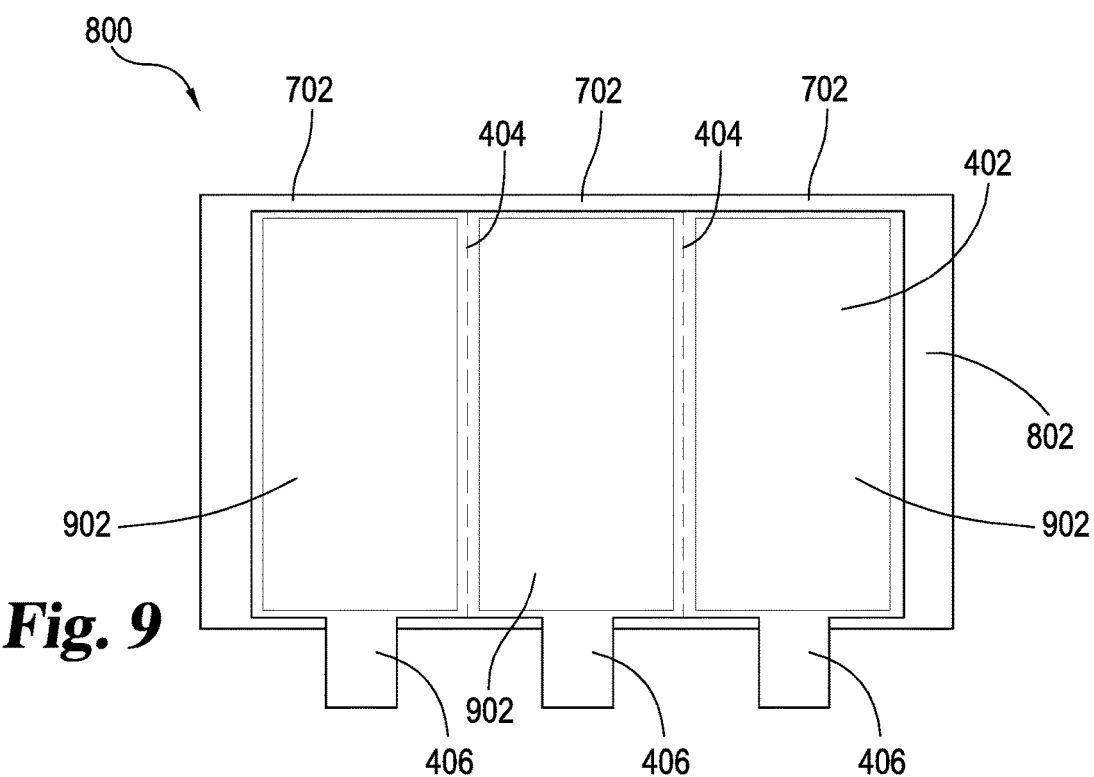
FIG. 9 shows a top view of the FIG. 8 tray with individual pull covers for each of the receptacles.

FIGS. 8 and 9 show another variation of a packaging system 800 for a tray 802. The tray 802 in this example is configured in the same manner as the tray 104 shown in FIGS. 1 and 2, but the tray 802 in this example includes multiple receptacles 202 for storing bird seed 204. In the depicted example, the tray 802 includes three (3) receptacles, but the tray 802 can include more or less receptacles 202 than shown. Looking at FIG. 9, the cover 402 covers all of the receptacles 202. The receptacles 202 are each surrounded by the releasable seals 702 so that each receptacle 202 is independently sealed in an airtight manner. The cover 402 has perforations 404 between each receptacle 202 to form separate cover sections 902 that are able to be removed from the tray 802 independently of one another. The cover sections 902 each include pull tabs 406 for facilitating removal of the cover sections 902 so as to allow birds access to the bird seed 204. The multiple cover sections 902 allow the bird seed to be rationed over time and/or allows different birds to be attracted depending on the type of bird seed 204 contained in the receptacles 202 without the need of removing the tray 802 from the housing 102. For example, one cover section 902 can be removed each day while the tray 104 remains in the housing 102. In another example, each receptacle 202 contains different types of bird seed 204 that attracts different types of birds. Each cover section can be marked with a name, symbol, and/or other identifier, such as a picture of a bird, so as to identify the type of bird seed 204 and/or the type of bird the bird seed 204 attracts. An individual can remove different individual or combinations of cover sections 902 so as to make the bird seed 204 accessible to the birds. In another example, the individual can remove all of the cover sections 902 before, during, or after the tray 802 is loaded into the housing, if so desired. In another variation, the tray 802 can include separate and distinct covers 402 over each receptacle 202.

Figure 10:
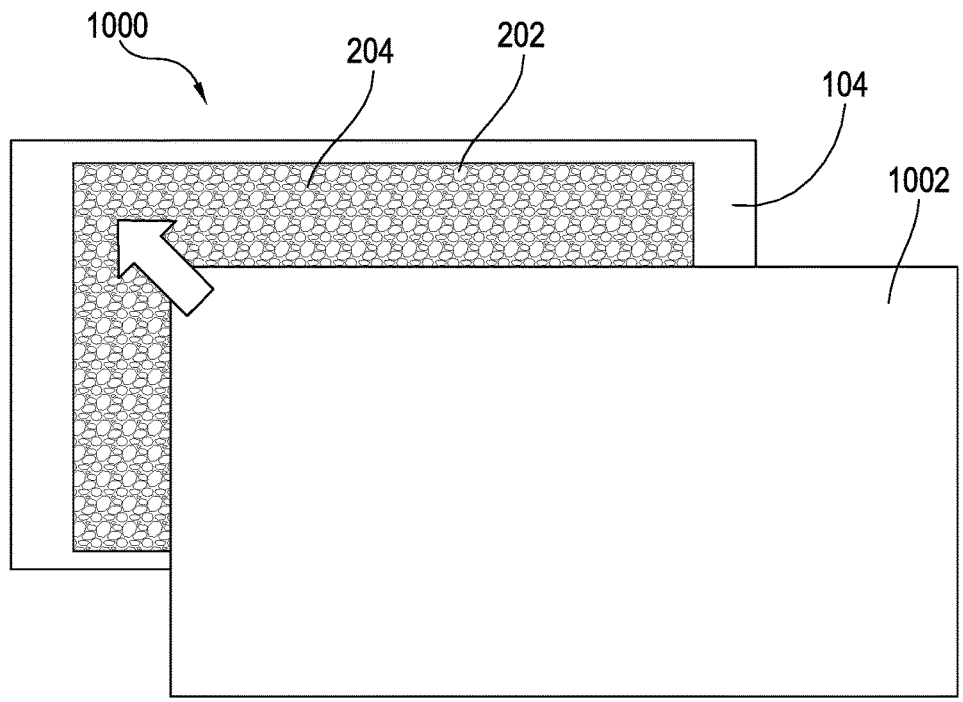
FIG. 10 shows an exploded view of a tray with a resealable lid for the FIG. 1 bird feeder.
Figure 11:
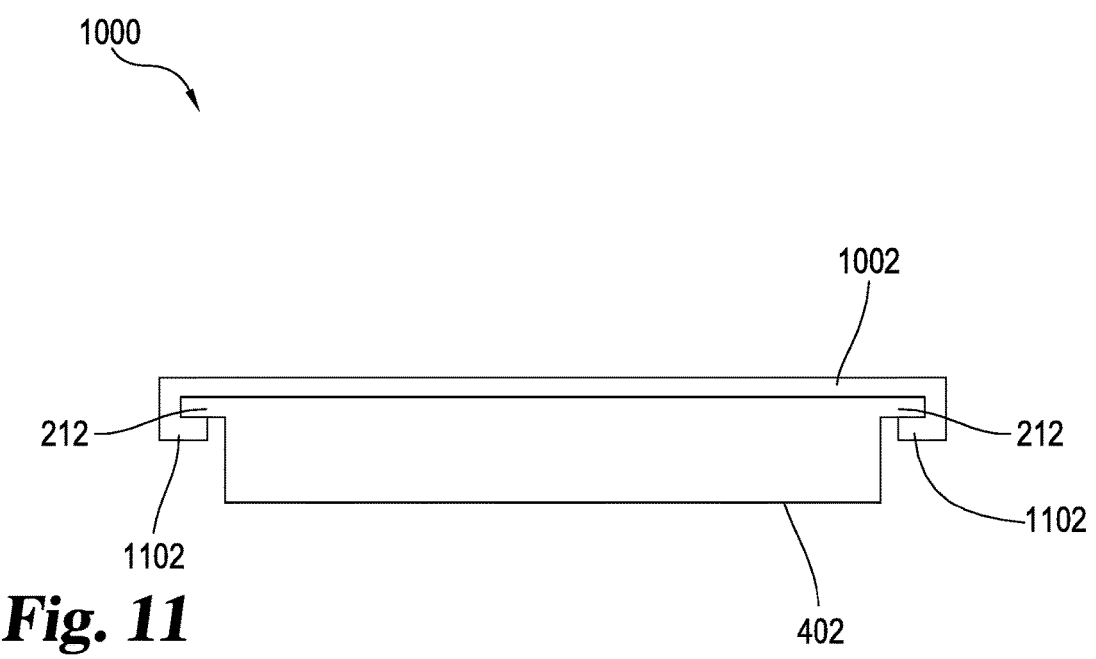
FIG. 11 is a cross-sectional side view of the FIG. 10 tray.

FIGS. 10 and 11 illustrate another packaging system 1000 for the tray 104. The packaging system 1000 includes a lid 1002 that encloses the receptacle 202 so as to retain the bird seed 204. The lid 1002 in the illustrated embodiment is a resealable type lid, but in other examples, the lid 1002 can be a one-time use type lid that can be discarded after removal. Looking at FIG. 11, the lid 1002 includes snap tabs 1102 that form a snap type connection with the flanges 212 of the container 104, but in other examples, different types of devices for connection of the lid 1002 to the tray can be used.

While some of the packaging systems, such as the covers, bags, and lids, were described above as forming sir tight seals, the packaging systems in other variations can not be airtight. For example, the packaging systems can include holes, vents, and/or meshes that facilitate airflow through the bird seed, and at the same time, retains the bird seed to prevent spilling. The packaging systems can also be made from material that is recyclable and/or compostable.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Bag" generally refers to a thin piece of material, such as plastic, paper, etc., that covers or surrounds something to protect it.

"Consumable" generally refers to something that is intended to be eaten or otherwise ingested. Examples of consumables include bird feed (seeds, suet, sugar water, etc.) and medication.

"Cover" generally refers to a thing that lies on, over, or around something, especially in order to protect or conceal it.

"Detachably secured" generally refers to coupling an object to another object in such a manner that the objects can be separated without requiring any tools and without damaging or otherwise destroying the objects.

"Tray" generally refers to a container with at least a partially raised rim to form a receptacle for contents.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The invention claimed is:

1. A method, comprising:
opening a packaging system to allow access to a consumable on a tray;
wherein the tray defines a receptacle in which the consumable is stored;
wherein the tray defines a receptacle opening for the receptacle;
wherein the tray has a rim that surrounds the receptacle opening;
wherein the packaging system includes a cover covering the receptacle of the tray;
wherein the packaging system seals the tray in an airtight manner;
wherein a releasable seal seals the cover to the rim completely around the receptacle opening to seal the tray in the airtight manner;
wherein said opening includes releasing the releasable seal;
wherein said opening exposes the consumable to air; and
securing the tray to a housing to form a bird feeder.

2. The method of claim 1, wherein said opening occurs after said securing the tray to the housing.

3. The method of claim 2, wherein said opening includes pulling a pull tab of a cover to remove at least part of the cover from the tray.

4. The method of claim 1, wherein said opening occurs before said securing the tray to the housing.

5. The method of claim 1, further comprising:
wherein the tray is made of recyclable materials;
removing the tray from the housing after said securing; and
recycling the tray after said removing.

6. The method of claim 1, further comprising:
wherein the tray is made of compostable materials;
removing the tray from the housing after said securing; and
composting the tray after said removing.

7. The method of claim 1, wherein said securing includes sliding the tray into one or more grooves defined in the housing.

8. The method of claim 1, further comprising:
protecting the consumable on the tray from an outside environment with a canopy of the housing after said opening.

9. The method of claim 1, further comprising:
hanging the housing from a structure before said securing.

10. The method of claim 1, wherein:
the cover includes one or more perforations; and
said opening includes tearing the cover along the perforations.

11. The method of claim 1, wherein said opening includes pulling a pull tab of the cover to remove the cover from the tray.

12. The method of claim 1, further comprising:
wherein the rim forms a flange;
wherein the housing includes a canopy;
wherein the housing includes a tray engagement rail that defines a groove;
wherein said securing includes sliding at least the flange of the tray into the groove of the housing; and
limiting movement of the tray towards the canopy of the housing by overlapping the flange with the tray engagement rail during said securing.

13. The method of claim 1, wherein:
the releasable seal includes a low tack adhesive; and
said opening includes releasing the low tack adhesive by pulling the cover from the tray.

14. The method of claim 1, wherein:
the releasable seal includes a weakened weld between the cover and the rim of the tray; and
said opening includes breaking the weakened weld by pulling the cover from the tray.

15. The method of claim 1, wherein said opening includes removing the entire cover from the tray.

16. The method of claim 1, wherein the tray has a generally rectangular box shape.

17. The method of claim 1, wherein:
the tray includes a second receptacle;
the cover includes cover sections covering the receptacle and the second receptacle; and
said opening includes removing the cover sections from the receptacle and the second receptacle independently of one another.

18. A method, comprising:
opening a packaging system to allow access to a consumable on a tray;
wherein the tray defines a receptacle in which the consumable is stored;
wherein the packaging system includes a cover covering the receptacle of the tray;
wherein the cover includes one or more perforations;
wherein the packaging system seals the tray in an airtight manner;
wherein said opening includes tearing the cover along the perforations;
wherein said opening exposes the consumable to air; and
securing the tray to a housing to form a bird feeder.

19. The method of claim 18, wherein said opening includes pulling a pull tab of a cover to remove at least part of the cover from the tray.

20. The method of claim 18, wherein:
the tray includes a second receptacle;
the cover includes cover sections covering the receptacle and the second receptacle; and
said opening includes removing the cover sections from the receptacle and the second receptacle independently of one another.

21. The method of claim 18, further comprising:
wherein the tray is made of compostable materials;
removing the tray from the housing after said securing; and
composting the tray after said removing.

22. The method of claim 18, wherein said securing includes sliding the tray into one or more grooves defined in the housing.

23. A method, comprising:
opening a packaging system to allow access to a consumable on a tray;
wherein the tray defines a first receptacle and a second receptacle in which the consumable is stored;
wherein the packaging system includes cover sections covering the first receptacle and the second receptacle of the tray;
wherein the packaging system seals the tray in an airtight manner;
wherein said opening includes removing the cover sections from the first receptacle and the second receptacle independently of one another;
wherein said opening exposes the consumable to air; and
securing the tray to a housing to form a bird feeder.

24. The method of claim 23, wherein said opening includes pulling a pull tab of the cover sections to remove at least part of the cover sections from the tray.

25. The method of claim 23, further comprising:
wherein the tray is made of compostable materials;
removing the tray from the housing after said securing; and
composting the tray after said removing.

26. The method of claim 23, wherein said securing includes sliding the tray into one or more grooves defined in the housing.

* * * * *